(12) United States Patent
Orishko et al.

(10) Patent No.: US 7,873,774 B2
(45) Date of Patent: Jan. 18, 2011

(54) CONNECTIONS AND DYNAMIC CONFIGURATION OF INTERFACES FOR MOBILE PHONES AND MULTIFUNCTIONAL DEVICES

(75) Inventors: Alexey Orishko, Grimstad (NO); Morten Christiansen, Arendal (NO); Kjell Heimdal, Grimstad (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 139 days.

(21) Appl. No.: 12/199,208

(22) Filed: Aug. 27, 2008

(65) Prior Publication Data

US 2009/0198859 A1 Aug. 6, 2009

Related U.S. Application Data

(60) Provisional application No. 61/025,436, filed on Feb. 1, 2008, provisional application No. 61/041,712, filed on Apr. 2, 2008.

(51) Int. Cl.
*G06F 13/20* (2006.01)
(52) U.S. Cl. .................................... 710/313; 455/550
(58) Field of Classification Search ................ 710/313, 710/100, 305–306; 455/422, 550
See application file for complete search history.

(56) References Cited

U.S. PATENT DOCUMENTS 6,959,350 B1  10/2005  Luke et al.

| 2007/0245057 | A1 | 10/2007 | Bohm et al. |
| 2007/0287498 | A1 | 12/2007 | Wang et al. |
| 2007/0293261 | A1* | 12/2007 | Chung ..................... 455/550.1 |
| 2009/0131036 | A1* | 5/2009 | Liang et al. .............. 455/422.1 |

FOREIGN PATENT DOCUMENTS

| EP | 1 775 652 A | 4/2007 |
| GB | 2 412 757 A | 10/2005 |

OTHER PUBLICATIONS

"High Speed Inter-ship delivers benefits to developers and consumers" [On-line] Nov. 14, 2007, XP002525217—Retrieved from the Internet: URL:http://www.usb.org/press/press20/2007_11_14_usbif_v3.pdf.

* cited by examiner

*Primary Examiner*—Thomas J Cleary
*Assistant Examiner*—Kim T Huynh

(57) ABSTRACT

An apparatus and method in a mobile device having a digital application-specific integrated circuit (DASIC) and a multifunctional integrated circuit (chip) providing additional functions to the mobile device. An internal Universal Serial Bus (USB) link connects the DASIC and the multifunctional chip. In one embodiment, the multifunctional chip is an ultra wideband (UWB) Radio Module. The internal USB link may utilize a USB interface, a USB 2.0 Universal Transceiver Macrocell Interface (UMTI+) and Low Pin Interface (ULPI), or a High Speed InterChip (HSIC) interface. The UWB Radio Module communicates over the air with an external remote wireless device such as a wireless USB Host utilizing a UWB radio link. The internal USB link provides connection and maps logical data streams in the DASIC with logical data streams in the UWB Radio Module or multifunctional integrated circuit.

20 Claims, 14 Drawing Sheets

CONNECTIONS AND DYNAMIC CONFIGURATION OF INTERFACES FOR MOBILE PHONES AND MULTIFUNCTIONAL DEVICES

CROSS-REFERENCE TO RELATED APPLICATIONS

This application claims the benefit of U.S. Provisional Application No. 61/025,436 filed Feb. 1, 2008 and U.S. Provisional Application No. 61/041,712 filed Apr. 2, 2008, the disclosures of which are incorporated by reference herein.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to wireless telecommunication networks. More particularly, and not by way of limitation, the present invention is directed to a system, method, and node for dynamically configuring interfaces between a mobile phone and multifunctional devices/radios.

The following abbreviations are utilized in the background and description herein:

| Abbreviation | Explanation |
| --- | --- |
| BT | Bluetooth |
| BToUWB | Bluetooth over UWB |
| CDC | Communication Device Class |
| CF | Compact Flash |
| WUSB | Wireless USB |
| DASIC | Digital application-specific integrated circuit |
| DCD | Device Controller Driver |
| DMA | Direct Memory Access |
| DME | Device Management |
| DRD | Dual-Role Device |
| DVB-H | Digital Video Broadcasting-Handheld |
| DWA | Device Wire Adapter |
| EP | Endpoint |
| FIFO | First-In-First-Out |
| FM | FM Radio |
| GPS | Global Positioning System |
| HCD | Host Controller Driver |
| HID | Human Interface Device |
| HSIC | High Speed InterChip |
| HW | Hardware |
| HWA | Host Wire Adapter |
| $I^2C$ | Inter-Integrated Circuit |
| INT | Interrupt |
| LD | Logical Driver |
| Local link (or transport link) | A physical link connecting DASIC and external chip |
| MAC | Media Access Control |
| ME | Mobile Equipment |
| MSC | Mass Storage Class |
| NFC | Near Field Communication |
| OBEX | Object Exchange Protocol |
| PAL | Protocol Adaptation Layer |
| PC | Personal Computer |
| PCI | Peripheral component interconnect |
| PHY | Physical (layer) |
| PictBridge | Standard created for direct printing from digital cameras to printers |

-continued

| Abbreviation | Explanation |
| --- | --- |
| PID | Product Identification |
| QoS | Quality of Service |
| RCI | Radio Control Interface |
| RFID | Radio Frequency Identification |
| SDIO | Secure Digital Input/Output |
| SIM | Subscriber Identity Module |
| SPI | Serial Peripheral Interface |
| SW | Software |
| UART | Universal Asynchronous Receiver/Transmitter |
| ULPI | UTMI+ Low Pincount Interface |
| USB | Universal Serial Bus |
| UTMI | USB 2.0 Universal Transceiver Macrocell Interface |
| UTMI+ | USB 2.0 Universal Transceiver Macrocell Interface (plus version) |
| UWB | Ultra Wideband |
| VID | Vendor Identification |
| WiMedia | Industry special interest group promoting UWB device standardization |
| WLAN | Wireless Local Area Network |
| WLP | WiMedia Logical Link Control Protocol |
| WMC | Wireless Mobile Communications |
| WUSB | Wireless USB |

FIG. 1 is a simplified block diagram illustrating a conventional mobile phone Digital Application-Specific Integrated Circuit (DASIC) 23 and a number of additional chips interfacing with the DASIC. Many mobile phones include a DASIC, which implements features of applicable radio standards. Today, mobile phones and other mobile/portable devices provide a wide range of functionality, such as RFID, FM, WLAN, UWB, BT, DVB-H, GPS, NFC, Secure Key/License Storage, Ciphering, Audio, 3D graphics, and the like. For several reasons, it is not possible to integrate the above functions in the main mobile phone DASIC. Therefore, in addition to the DASIC, the mobile phone must have several additional integrated circuits (chips) providing all the needed functionality. Currently such additional chips use several different HW interfaces to the DASIC, such as SPI, UART, $I^2C$, SDIO, and the like.

Because of the different nature of these technologies, different vendors provide these chips. This causes several problems, including:

The mobile device vendor has to integrate chips from different providers.

Different HW interfaces are used to connect external chips.

Most of the HW interfaces have large pin counts and are not suitable for mobile devices, thus increasing the size needed to integrate the chip. An increased number of layers may also be required for interconnecting such a chip.

Different drivers are needed to handle every HW interface.

Different clocks are needed for different HW interfaces.

Different power levels may be needed for different HW interfaces.

Different test tools and analyzers are needed to debug every HW interface during the development process.

The size of the mobile device is increased with the number of functions included.

The end-user product has increased power consumption.

The time needed to integrate all parts into a complete solution is increased.

A large number of external chips makes the mobile device more expensive.

In an attempt to overcome such problems, some chip vendors have tried to make a combined chip, containing two different functions (for example BT and WLAN). However, each function on the combined chip still uses a different HW interface, thus leaving most of the problems unsolved.

SUMMARY

It would be advantageous to have an apparatus and method that overcomes the disadvantages of the prior art by combining different functions on an external multifunctional integrated circuit (chip), and utilizing a USB interface to interconnect the mobile device DASIC and the multifunctional chip. The HW interface may be USB, ULPI, or HSIC. A MUX device class may be utilized to handle logical data flows for different functions, and a proprietary USB device class may be utilized to handle such connections.

The present invention also provides a local connection with higher throughput that supports data traffic with different priorities and QoS requirements. The invention enables the use of large data buffers for bulk endpoints, thus significantly reducing the interrupt load and increasing overall system throughput.

Other advantages of the present invention include a reduced number of external chips and consequent reduction in the pin count and layers needed to integrate external chips. The number of different clocks and power levels needed to supply to external chips and the total footprint of the mobile device are also reduced. For combined radio chips, the common MAC layer may help to schedule transmissions to reduce interference between different radios. The USB connection between the DASIC and the multifunctional chip makes the solution more flexible and dynamically configurable. USB IP blocks and USB stack SW are widely available, making investment for new product development less expensive, and providing faster time to market since HW and SW interfaces are reusable.

It is noted that USB bandwidth is more than enough for existing technologies. Also, since all of the functions on the multifunctional chip will not be used simultaneously, the throughput requirement for the link between the DASIC and the external chip is reduced. For future throughput requirements, the invention may utilize USB 3.0 capabilities. Since USB 3.0 will utilize the same framework, all SW would be forward-compatible.

In addition to providing independent access to different functions within a multifunctional chip, the present invention may also provide a separate logical link for each functional area. The USB DFU device class may be used for Firmware upgrades on the external chip, or alternately, binary code may be loaded during the power up cycle for chips with RAM only. Functionality of the connected chip may be increased without increasing mobile device size by adding a new logical data flow over the USB connection. Additionally, several multifunctional chips may be connected utilizing the same approach. The development phase for such a configuration is simplified since an ordinary USB connection may be used between the DASIC and external chip development boards. Widely available USB analyzers may be utilized to trace and debug communication between the DASIC and the external chip.

In an exemplary embodiment of the present invention, a UWB Radio Module is connected to the phone or mobile device via an internal USB link using a USB interface, a ULPI interface, or a High Speed InterChip (HSIC) interface. By doing so, advantages are provided by existing USB HW, system SW, and device SW. Among those are:

Logical separation of data flows;
Flow control on HW level;
USB data rate;
Configuration flexibility;
Support for different device classes;
Support for different data transfer types; and
Provision for vendor extensions.

In one embodiment, the present invention provides a direct mapping of wireless USB device endpoints to "local connection" ULPI endpoints. The invention utilizes all available endpoints of the internal USB interface and dynamically associates with logical endpoints of a Wireless USB connection or any other UWB PAL.

In another embodiment, a new USB Device Class is utilized to multiplex several logical data streams without copying data for different clients on the receiver side (i.e., without sharing data between different pairs of endpoints). The first level of multiplexing and de-multiplexing may be USB HW, and other levels may be provided by a new USB Device Class Driver. The driver distributes received buffers to all connected clients.

In other embodiments, combinations of direct mapping, multiplexed mapping, and sharing of logical data streams are utilized.

Thus, in one embodiment, the present invention is directed to an apparatus in a mobile device for providing a plurality of functions for the mobile device. The apparatus includes a DASIC for controlling the mobile device according to applicable radio standards; a multifunctional integrated circuit having means for providing a plurality of functions; and a USB link connecting the DASIC and the multifunctional integrated circuit. The USB link includes means for logically mapping endpoints in the multifunctional integrated circuit to local connection endpoints in the DASIC.

In another embodiment, the present invention is directed to an apparatus in a mobile device having a digital application-specific integrated circuit (DASIC) and an ultra wideband (UWB) radio module. The apparatus includes an internal Universal Serial Bus (USB) link connecting the DASIC and the UWB radio module, wherein the internal USB link utilizes an interface selected from a group consisting of a USB interface, a Universal Transceiver Macrocell Interface (UTMI+) and Low Pincount Interface (ULPI), and a High Speed InterChip (HSIC) interface. The internal USB link includes means for logically mapping endpoints in an external device to local connection endpoints in the DASIC.

In another embodiment, the present invention is directed to a method in a mobile device for connecting the mobile device to an external wireless device, wherein the mobile device includes a DASIC and a UWB radio module. The method includes the steps of connecting the DASIC to the UWB radio module with an internal USB link, wherein the internal USB link utilizes an interface selected from a group consisting of a USB interface; a ULPI interface, and an HSIC interface. The method also includes communicating with the external device utilizing the UWB radio module, and logically mapping endpoints in the external device to local connection endpoints in the DASIC utilizing the internal USB link.

BRIEF DESCRIPTION OF THE SEVERAL VIEWS OF THE DRAWING

In the following section, the invention will be described with reference to exemplary embodiments illustrated in the figures, in which.

DETAILED DESCRIPTION

Figure 1:
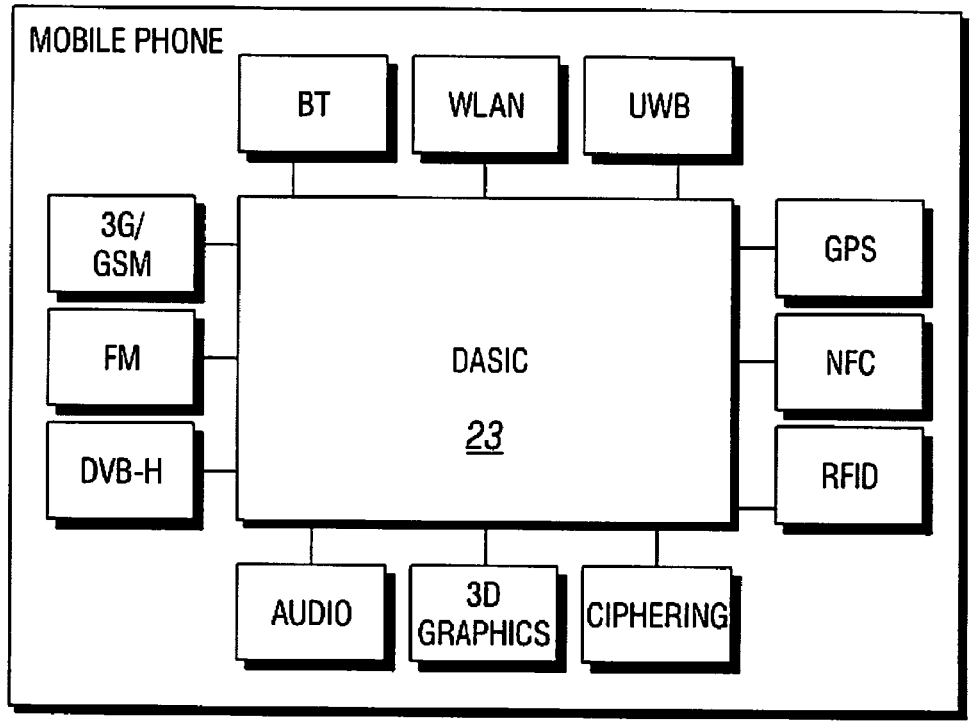
FIG. 1 (Prior Art) is a simplified block diagram illustrating a conventional mobile phone Digital Application-Specific Integrated Circuit (DASIC) and a number of additional chips interfacing with the DASIC.
Figure 2:
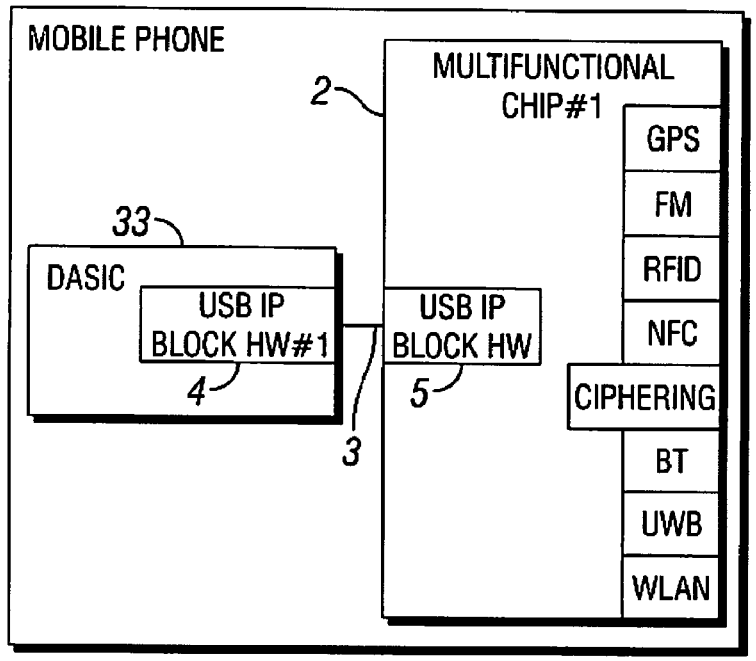
FIG. 2 is a simplified block diagram illustrating a first exemplary embodiment of the present invention.

FIG. 2 is a simplified block diagram illustrating a first exemplary embodiment of the present invention. In this embodiment, a plurality of different functions are combined on a multifunctional chip 2. A USB interface 3 interconnects a modified mobile phone DASIC 33 and the multifunctional chip. The DASIC 33 includes a USB IP Block HW module 4 for terminating the USB interface in the DASIC, and the multifunctional chip includes a USB IP Block HW module 5 for terminating the USB interface in the multifunctional chip. The HW interface 3 may be USB, ULPI, or HSIC. A MUX device class is utilized to handle logical data flows for different functions, and a proprietary USB device class handles the connections.

It should be understood that the term "mobile phone" as utilized herein is intended to include all mobile and portable devices, as well as multifunctional PC peripherals, connected via the USB bus. Thus, the invention is applicable for any mobile or handheld device, including portable and desktop computers. The invention may also be used to interconnect multifunctional peripherals to any consumer electronic or industry equipment. For example: built-in entertainment system for the car with connected BT+GPS multifunctional module, POS terminal with RFID/NFC/BT/UWB module for mobile phone payment, GPS and UWB/BT for remote control for some machinery, and the like.

Figure 3:
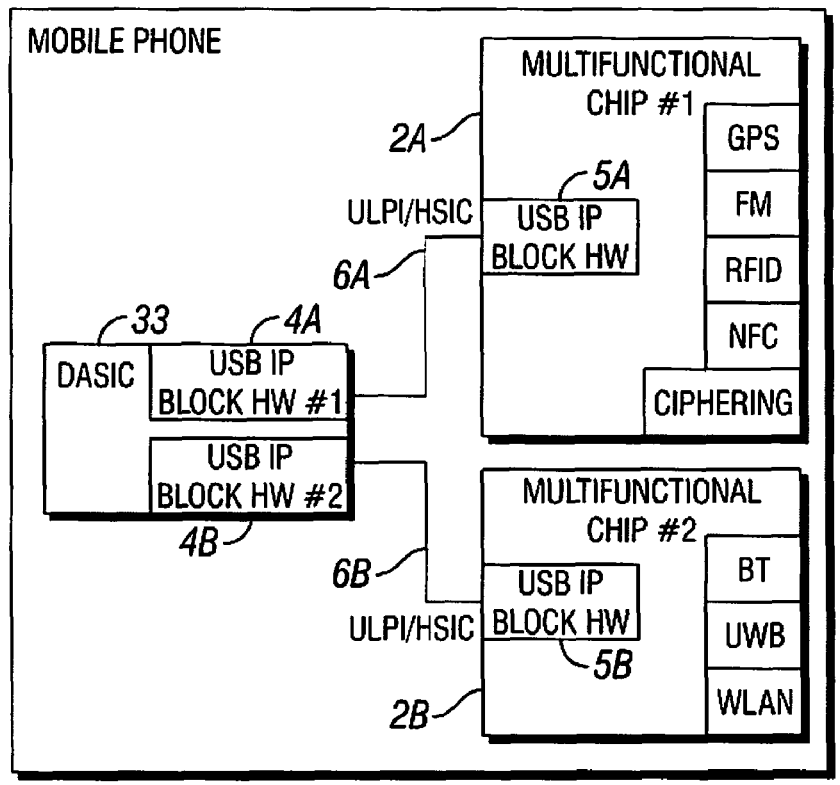
FIG. 3 is a simplified block diagram illustrating a second exemplary embodiment of the present invention.

FIG. 3 is a simplified block diagram illustrating a second exemplary embodiment of the present invention. In this embodiment, the plurality of different functions are combined on two multifunctional chips 2a and 2b. Two ULPI/HSIC interfaces 6a and 6b interconnect the mobile phone DASIC 33 and the multifunctional chips. The DASIC 33 includes two USB IP Block HW modules 4a and 4b, and the multifunctional chips include a USB IP Block HW module, 5a and 5b, respectively. Although FIG. 3 shows two external multifunctional chips and two USB IP Block HW modules in the DASIC, it should be understood that more than two of each may be utilized in different embodiments.

Figure 4:
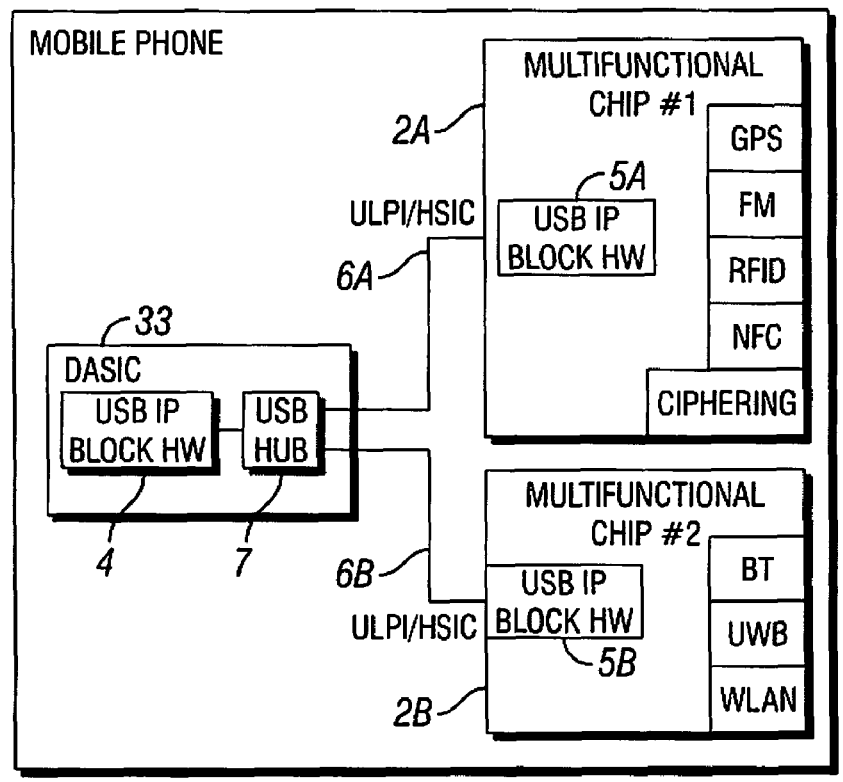
FIG. 4 is a simplified block diagram illustrating a third exemplary embodiment of the present invention.

FIG. 4 is a simplified block diagram illustrating a third exemplary embodiment of the present invention. In this embodiment, the plurality of different functions are again combined on two multifunctional chips 2a and 2b. Two ULPI/HSIC interfaces 6a and 6b interconnect the mobile phone DASIC 33 and the multifunctional chips. The DASIC in this embodiment includes a USB hub 7 or hub-like HW enabling several multifunctional chips to be connected to the same USB IP Block HW module 4. Although FIG. 4 shows two external multifunctional chips connected to the USB hub, it should be understood that more than two multifunctional chips may be connected in different embodiments. By using HUB-like HW, several multifunctional chips may be connected, thus reducing a need for several IP cores in the DASIC.

Figure 5:
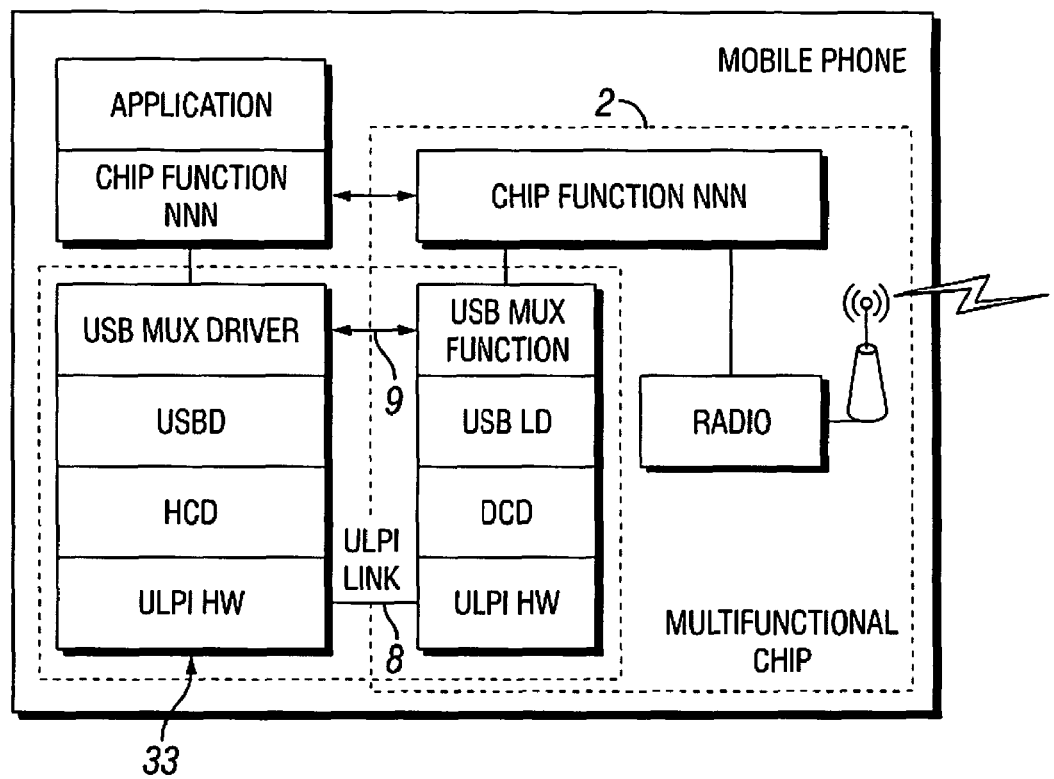
FIG. 5 is a functional block diagram illustrating an exemplary embodiment of a protocol stack for a ULPI link for a multifunctional chip.

FIG. 5 is a functional block diagram illustrating an exemplary embodiment of a protocol stack for a ULPI link for a multifunctional chip 2. FIG. 5 shows the logical and actual data flows between a modified DASIC 33 and the multifunctional chip 2. A ULPI interface 8 connects ULPI HW in the DASIC with ULPI HW in the multifunctional chip, and a USB MUX interface 9 connects a USB MUX Driver in the DASIC with a USB MUX function in the multifunctional chip.

Figure 6A:
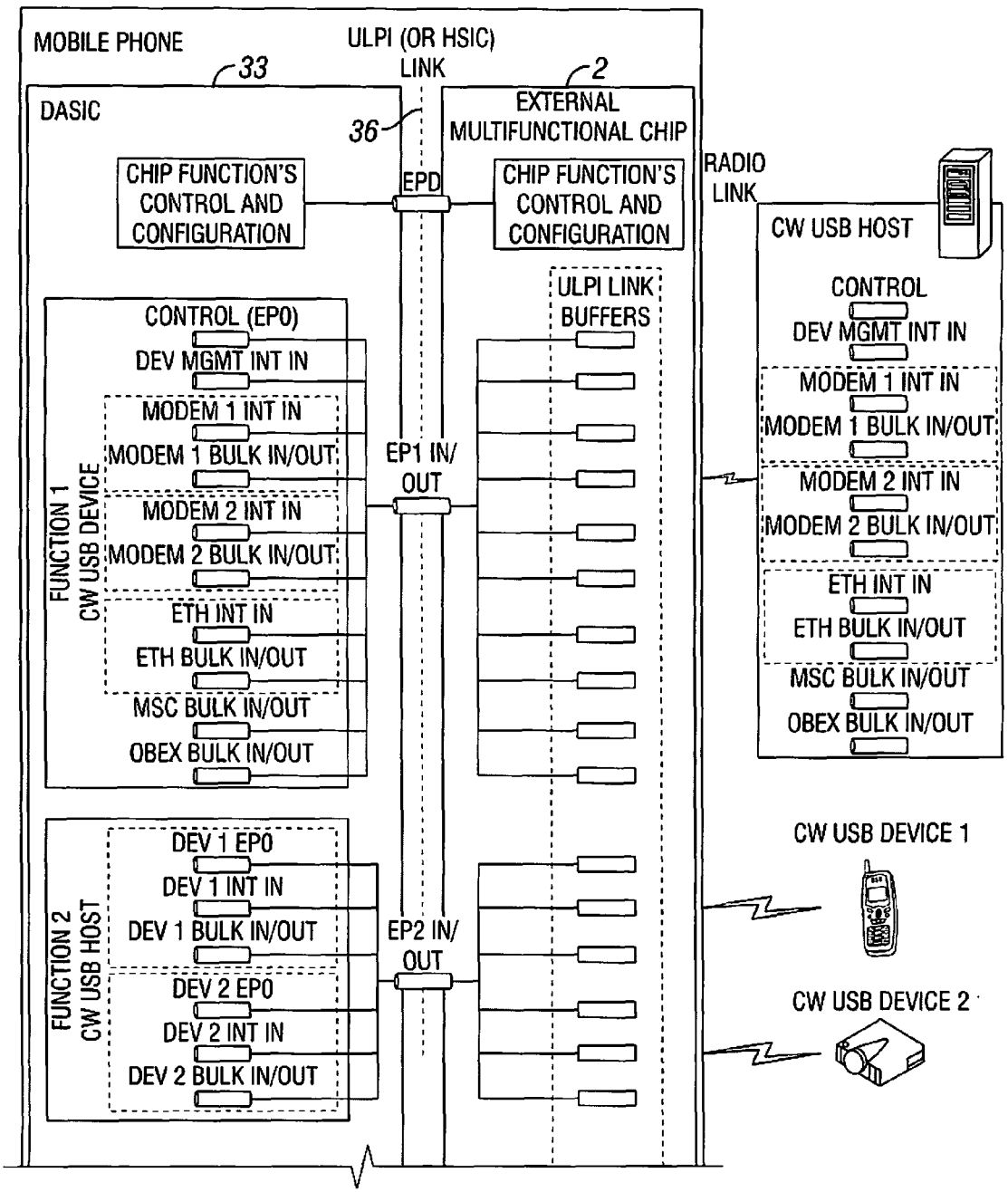
FIGS. 6A-6B are portions of a simplified block diagram illustrating an embodiment of endpoint mapping between a DASIC and a multifunctional chip.
Figure 6B:
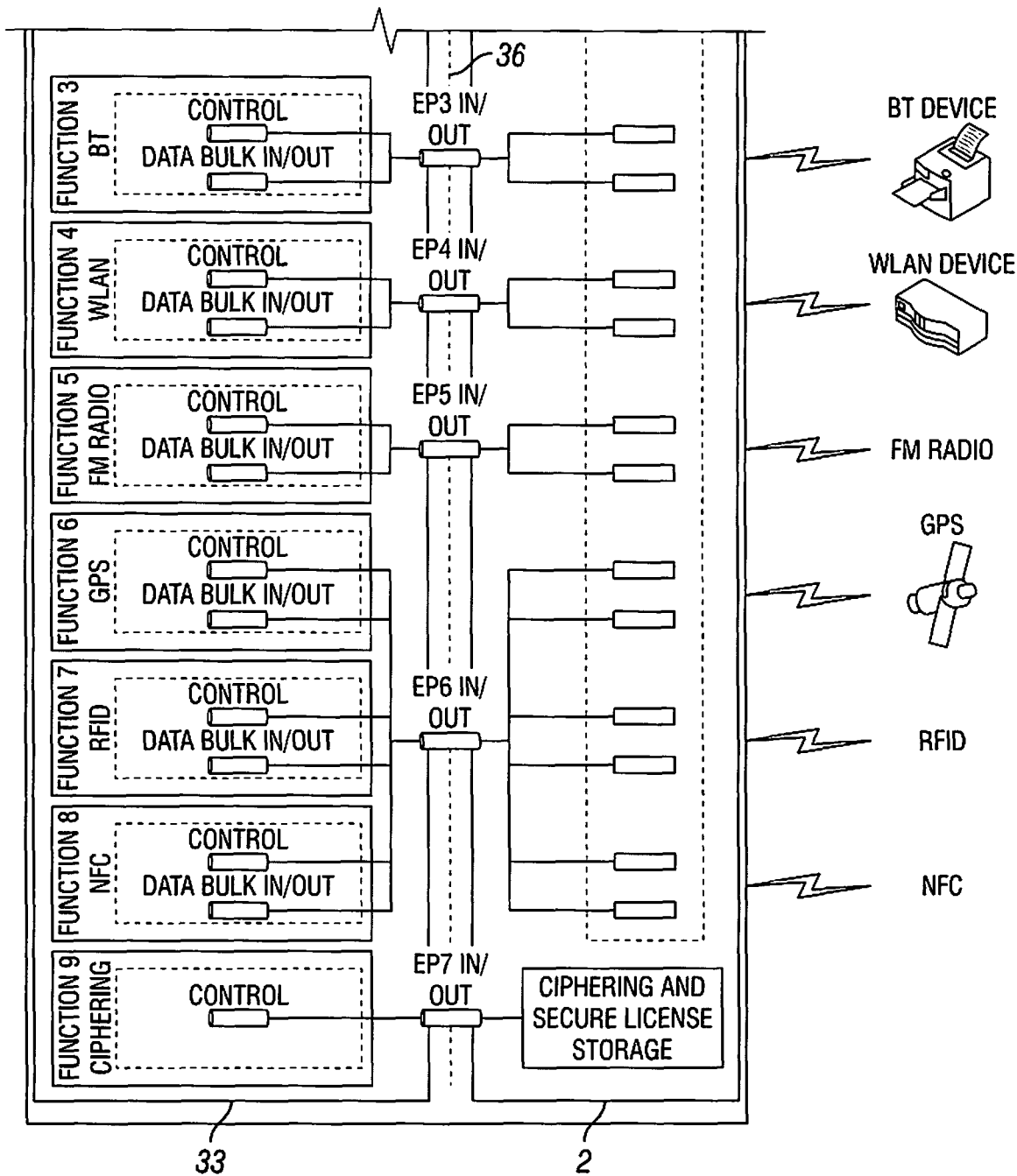

FIGS. 6A-6B are portions of a simplified block diagram illustrating an embodiment of endpoint mapping between a mobile phone DASIC 33 and an external multifunctional chip 2 utilizing a ULPI or HSIC link 36. Local ULPI endpoints are associated with logical connections on the protocol stack level. In other words, endpoints are assigned to specific WiMedia PALs for UWB Radio or some other logical interface for another functionality on a multifunctional chip 2. The WiMedia MAC layer handles the buffering of data received over the radio link per WUSB endpoint (or per logical channel on another PAL). These buffers are transferred to the corresponding WUSB device function from the UWB Radio Module. Similar buffer handling is done for other functions within the multifunctional chip 2. Thus, in this embodiment, a multiplexing of logical streams of different functions and PALs is performed for a single wired endpoint for the internal transport link. Several different logical streams or functions may be grouped based on their profiles and data stream properties. Different wired endpoints are used for different groups of multiplexed logical links.

Among technologies that will benefit from such a solution, is WiMedia Alliance Ultra Wideband (UWB) Radio. UWB Radio supports several protocol stacks and has several levels of logical data flows. Thus, it provides a good example for explanation of different configurations and benefits of the present invention.

UWB technology allows high speed wireless connections between UWB devices. The WiMedia specification covers the MAC and PHY layers and allows multiple protocol stacks to share UWB radio bandwidth. Different protocol stacks bind to the WiMedia platform by using a Protocol Adaptation Layer (PAL). PALs are different for every protocol stack.

Figure 7:
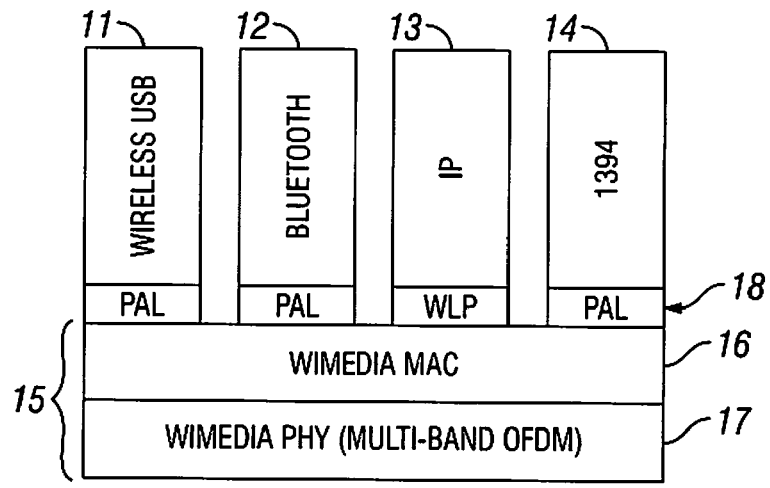
FIG. 7 (Prior Art) is an illustrative drawing of a plurality of protocol stacks bound to a UWB common radio platform.

FIG. 7 is an illustrative drawing of a plurality of protocol stacks 11-14 bound to a UWB common radio platform 15, as specified by WiMedia. Any other standard or proprietary protocol such as HDTV, for example, can be added as well. The UWB common radio platform covers the MAC layer 16 and PHY layer 17. The different protocol stacks bind to the UWB common radio platform utilizing PALs 18.

The first WiMedia products available are oriented to the PC market, but vendors are designing modules for mobile phones and other mobile devices. Existing UWB solutions on the market utilize the following interfaces: CF+, SDIO, PCIe, USB, and SPI.

Figure 8:
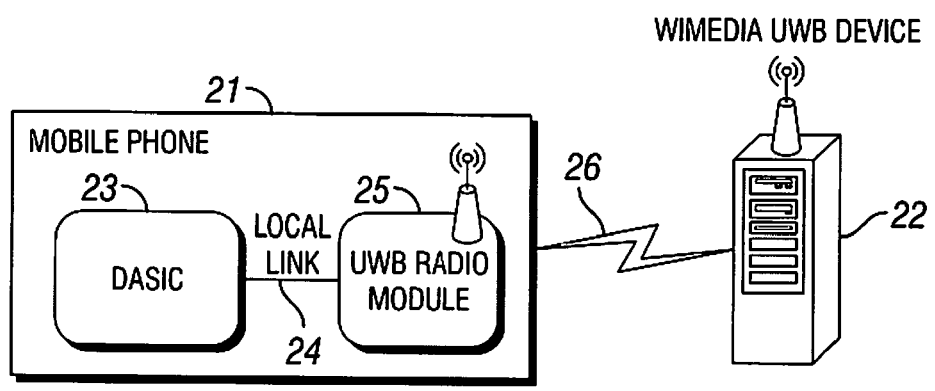
FIG. 8 (Prior Art) is a simplified block diagram of a UWB connection between a mobile phone and a WiMedia UWB device.

FIG. 8 is a simplified block diagram of a conventional UWB connection between a mobile phone 21 and a WiMedia UWB device 22. The mobile phone includes a DASIC 23 having several PAL's. The DASIC is connected by a local link 24 to a UWB Radio Module 25. The UWB Radio Module connects to the WiMedia UWB device via a UWB radio link 26 and an appropriate PAL.

Logical connections between the Mobile Phone DASIC 23 and the WiMedia UWB Device 22 are provided by two physical links: the UWB Radio link 26 and the local link 24. The local link "tunnels" WiMedia data from the UWB Radio Module 25 to the Mobile Phone DASIC 23. The High Rate Ultra Wideband PHY and MAC Standard, ECMA-368 is a specification for the radio link provided by WiMedia, but no specification exists for logical data transfer over the local link.

The WiMedia UWB Device 22 may have several protocol stacks running simultaneously, such as a wireless USB Device, wireless USB Host, BToUWB, or an IP. Note that first-generation UWB devices have only one function and one PAL. Data flow over the local link is very simple and includes one USB function plus a Radio Control Interface (RCI).

Figure 9:
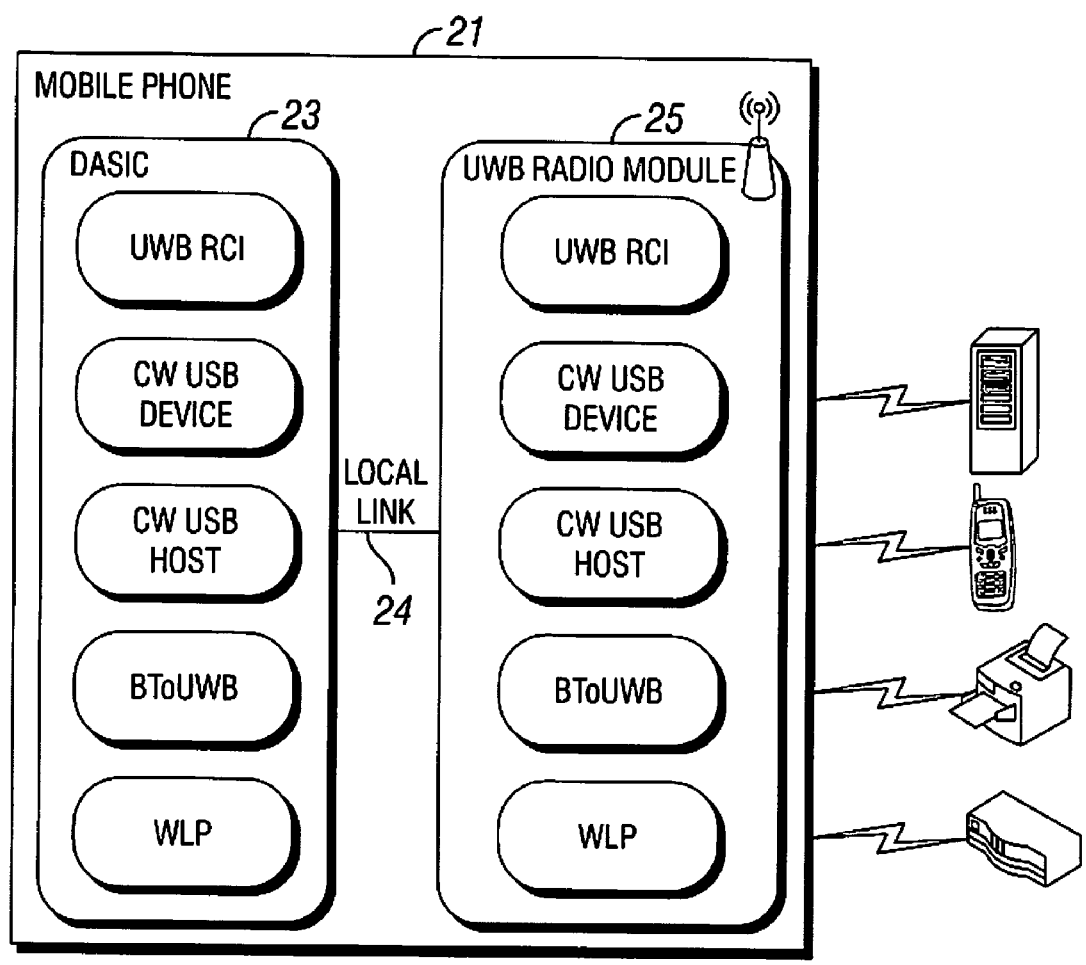
FIG. 9 (Prior Art) is a block diagram of the mobile phone showing additional functionality of the DASIC and the UWB Radio Module.

FIG. 9 is a block diagram of the mobile phone 21 showing additional conventional functionality of the DASIC 23 and the UWB Radio Module 25. The DASIC and the UWB Radio Module each support a plurality of protocol stacks.

The throughput on commonly used local links is low in existing solutions. For example, SDIO throughput is limited by the SDIO theoretical maximum of 200 Mbps for 4 lines at 50 MHz. Practical or achievable throughput is lower. Even if a higher throughput is obtained over the air using the UWB radio, the SDIO link still limits useful throughput.

Current HWA and DWA solutions have theoretical throughput limitations as well. The limit is about 250 Mbps, and existing implementations are capable of providing only about 80 Mbps. However as native UWB hosts and device implementations become common, and the next generation UWB radios become available, the SDIO or similar local links will be very limiting for actual throughput. In addition, as storage becomes cheaper and media files become larger in the future, the higher throughput is both possible and required.

Another problem is that the commonly available local link solutions all use FIFO mode with just one data stream. So it is not really possible to have data traffic with different priorities since the previous transfer must be finished first. Nor can QoS be guaranteed, which is needed for isochronous data transfer. This is not a problem with the single function device, but is a major issue for multiple PALs and functions where contention issues must be resolved.

Contention issues can be solved with small packets and frequent switching between input and output mode. However for a complex UWB device or host with multiple PALs and functions, this process requires a powerful CPU. This causes additional cost, size, and power consumption which are all vital to minimize in a mobile device like a mobile phone.

Other multifunctional radio devices like Bluetooth, WiFi, FM, and the like use separate physical interfaces toward the mobile phone DASIC 23, which requires more circuitry and components resulting in higher production cost. In addition, different device drivers are needed for different HW interfaces.

Isochronous transfer support requirements cannot be achieved with SDIO interfaces, and direct endpoint mapping with a UTMI+ Low Pincount Interface (ULPI) cannot be used in all cases since the number of ULPI endpoints is limited.

The present invention provides a local connection with higher throughput that supports data traffic with different priorities and QoS requirements. The invention enables the use of large data buffers for bulk endpoints, thus significantly reducing the interrupt load and increasing overall system throughput.

No USB specification exists for UWB devices (except HWA and DWA) or any multifunctional radio devices. The WMC specification (USB CDC WMC 1.0 Universal Serial Bus CDC Subclass Specification for Wireless Mobile Communication Devices) does not cover the technical solution needed for UWB.

Figure 10:
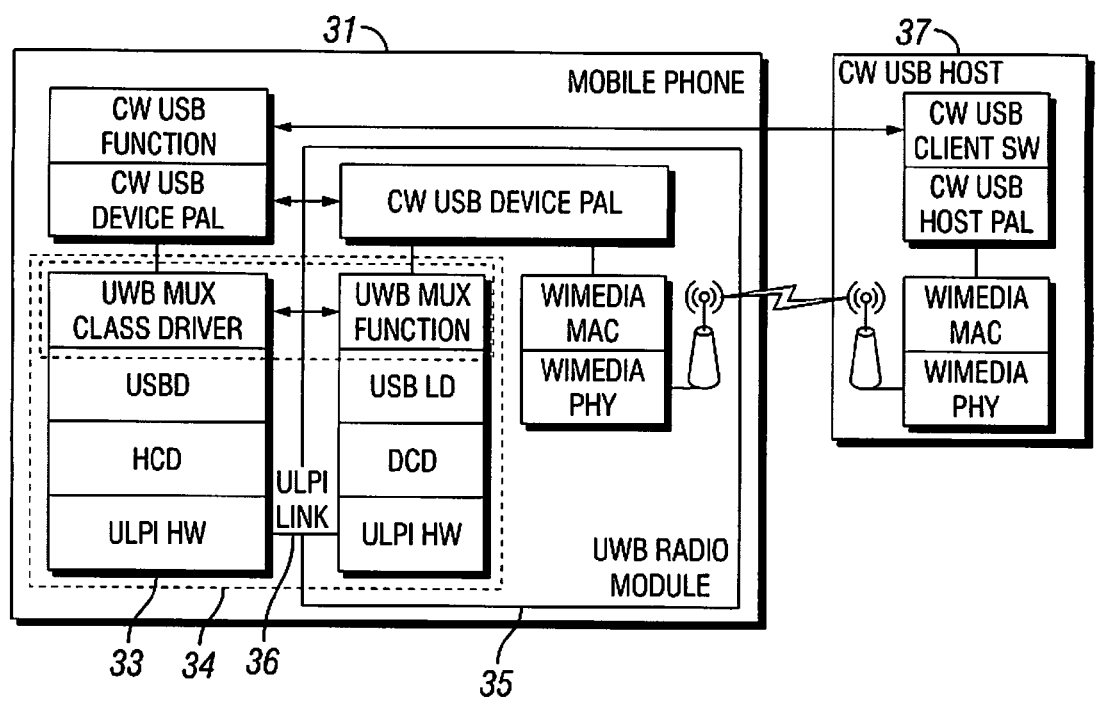
FIG. 10 is a simplified block diagram of a mobile phone illustrating an exemplary embodiment of the present invention.

FIG. 10 is a simplified block diagram of a mobile phone 31 illustrating an exemplary embodiment of the present invention. FIG. 10 shows the logical and actual data flows between a modified DASIC 33, a modified UWB Radio Module 35, and a WUSB Host system 37. An exemplary embodiment of the present invention is shown in the area surrounded by the bold dashed line marked by the digit 2. A local "transport" link 34 connects the mobile phone DASIC and the UWB Radio Module. The link is surrounded by a dotted line marked by the digit 1.

Note that the local link is shown using the ULPI interface 36. This is an existing digital interface on the DASIC that is normally used to connect to the USB transceiver that connects the DASIC to the USB bus. ULPI is low power compared to standard USB, and requires no external and power-hungry analog circuitry. ULPI is designed as a chip-to-chip connection inside the mobile device. The ULPI interface can easily be converted to a HSIC interface that allows the same functionality but with fewer pins, which reduces size, cost, and power. HSIC will become available and replace ULPI in the near future.

Thus, the illustrated embodiment of the present invention is relevant to either a USB link, ULPI link, or HSIC link. The USB HW and SW in the DASIC and the UWB radio is the same, the choice of interface is just an implementation choice based on cost, size, power, and availability.

If a ULPI HW interface is used between the WUSB Host system 37 and the UWB Radio Module 35, ULPI endpoints must be associated with logical connections on the protocol stack level, i.e., endpoints are assigned to specific PALs. Also, different PALs may be separated by using different endpoints on the local ULPI link 36.

The invention maintains logical separation of the protocol stacks, as shown above in FIG. 7. Every PAL is located on top of a UWB MUX Device Class. This device class multiplexes/de-multiplexes logical data streams for a specific PAL and a logical destination within the PAL without sharing data between different pairs of endpoints.

However, there is a need for an additional level of flexibility. For example, consider the WUSB Device stack. Some configurations, such as the Mass Storage Class (MSC), have just one interface consisting of one bulk pair. WMC consists of several USB functions, which are used by a PC host. Mobile phone USB functions may include, for example, Device Management, Modem-1, Modem-2, Mass Storage, Ethernet, and OBEX. Each of these functions may have one or more interfaces defined, and each function may use one or more endpoints as shown in Table 1 below.

TABLE 1

| Function | Endpoints |
| --- | --- |
| Modem | Interrupt IN + Bulk OUT & Bulk IN |
| Device Management | Interrupt IN |
| Mass Storage | Bulk OUT & Bulk IN |
| Ethernet | Interrupt IN + Bulk OUT & Bulk IN |
| OBEX | Bulk OUT & Bulk IN |

This means several logical data flows are needed within the WUSB Device PAL, each of them corresponding to a wireless USB endpoint.

For the WUSB Host stack, there may be several wireless devices connected, each of them containing several interfaces. An additional level is needed for wireless host logical data flow over the ULPI link to group interfaces for every remote wireless USB device.

There is no UWB Device class defined in the USB specification. Since several different functions must be combined, the WMC Device class is utilized in the present invention as a way to aggregate all different interfaces in one well defined USB Device Class.

In order to solve existing problems, a new "UWB MUX" Device Class is utilized. Generally, this device class encapsulates several data frames in one transaction over the ULPI link. A data frame within the transaction or MUX buffer could contain one USB packet, one IP datagram, or some kind of data buffer for another PAL. Before data can be sent, both sides use Control requests to configure mapping between both sides for every logical flow in every PAL. This information is used later for constructing headers on the sending side and forwarding data to the right destination on the receiver side.

It should be understood that both the DASIC and the UWB Radio module have a set of ULPI endpoints, thus mapping is done on both sides of the internal local link (ULPI link), so instead of DASIC it may be more accurate to refer to the "mobile device (or phone)". The ULPI connection is simply a "tunnel" for connecting two CPUs (one in the DASIC and another in the UWB chip). So PAL is above the transport level. PAL is an adaptation layer between WiMedia MAC and the protocol above it (WUSB, BT, IP). When referring to the ULPI link, it is a data "tunnel" with a few separate logical channels (endpoints), which are used to transfer high level protocol data between the DASIC and the external chip (in case of WUSB PAL-WUSB endpoints data). To avoid confusion, it should be noted that the same USB technology is utilized for the transport layer as well as for the high level protocol layer (WUSB).

Figure 11:
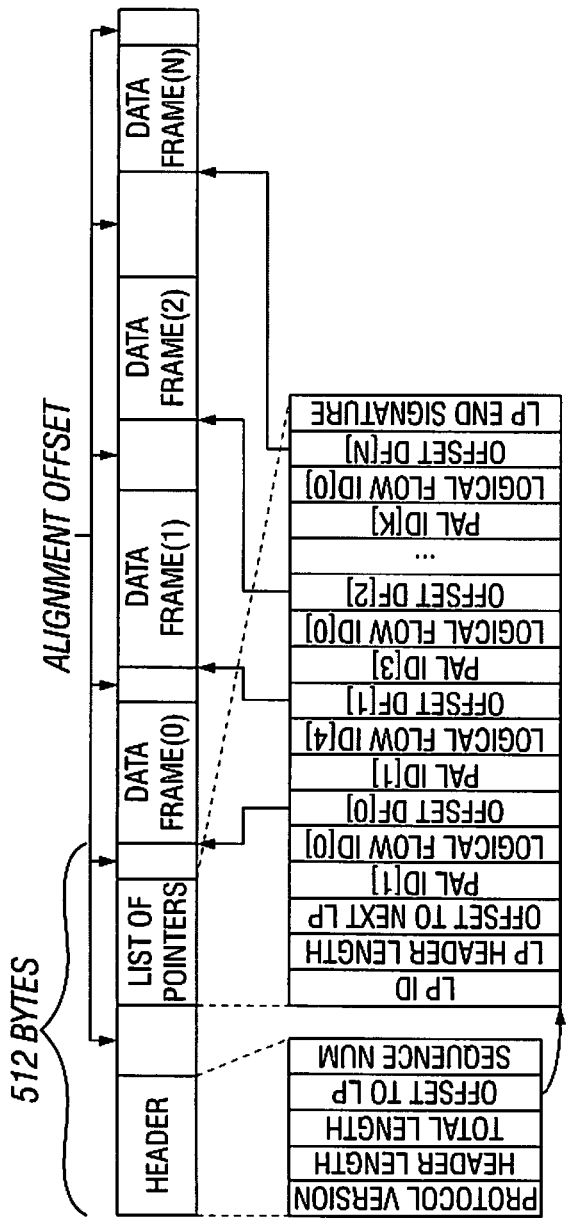
FIG. 11 illustrates a UWB MUX Data Buffer Format.

FIG. 11 illustrates the UWB MUX Data Buffer Format. When sender-identified data is buffered, which are ready to be transferred to the other side of the ULPI link, the ULPI link constructs Header, List of Pointers (LP), and data to be transmitted over ULPI. As an option, the sender may send the header and the list of pointers separately in a 512-byte packet. This provides the receiving side with an option to program a DMA controller to move buffers for each logical link to dedicated buffers for each link. This reduces the need for extra copies of data.

As another way to improve performance, if more data buffers are ready to be transferred, the next Header and List of Pointers may be attached after all Data Frames. This helps the DMA controller to set up a next data transfer and decrease the number of interrupts.

Many DMA controllers require the data buffer to be located in RAM on some specified boundary, for example a 32-byte boundary. Thus, by utilizing an offset for Data Frames, the system avoids any penalty if frames are not aligned. The sender fills the gaps by transmitting the necessary number of bytes, which are set to zero.

On the receiver side, the header is read and DMA transfers are set according to information located in the List of Pointers (LP). For convenience, another element may be added for grouping logical flows within one PAL. For example, for the Wireless USB Host case, it may be useful to identify all logical flows for a particular WUSB Device. The identifier PAL ID is utilized to identify the WUSB Host PAL, Group ID is utilized to identify the WUSB Device connected to this host, and LF ID is utilized to identify a data flow for a particular endpoint.

It is noted that this embodiment of the invention multiplexes data over one ULPI endpoint. Therefore, built-in USB flow control cannot be utilized because at a particular time, some client software may receive data and some may not.

Figure 12:
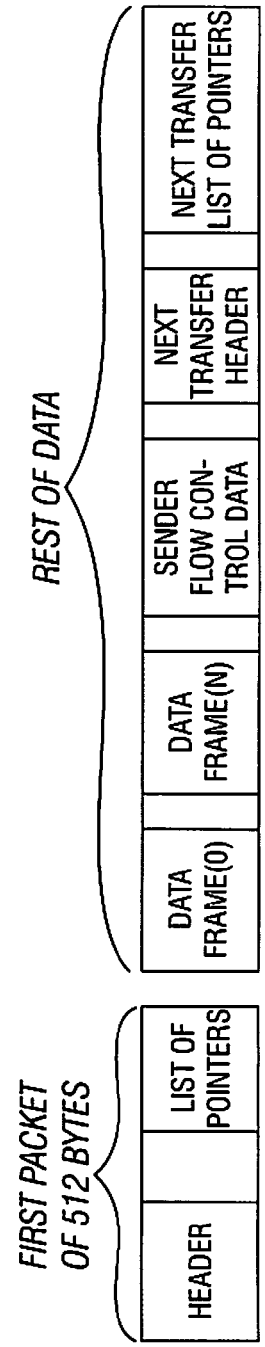
FIG. 12 illustrates an embodiment of the UWB MUX format with additional Flow Control information.

FIG. 12 illustrates an embodiment of the UWB MUX format with additional Flow Control information. In this embodiment, the List of Pointers may also contain flow control between the DASIC 33 and the UWB Radio Module 35. Additionally, the Sender may advertise its availability to receive data for some logical streams by appending Flow Control information at the end of the current transfer.

Figure 13:
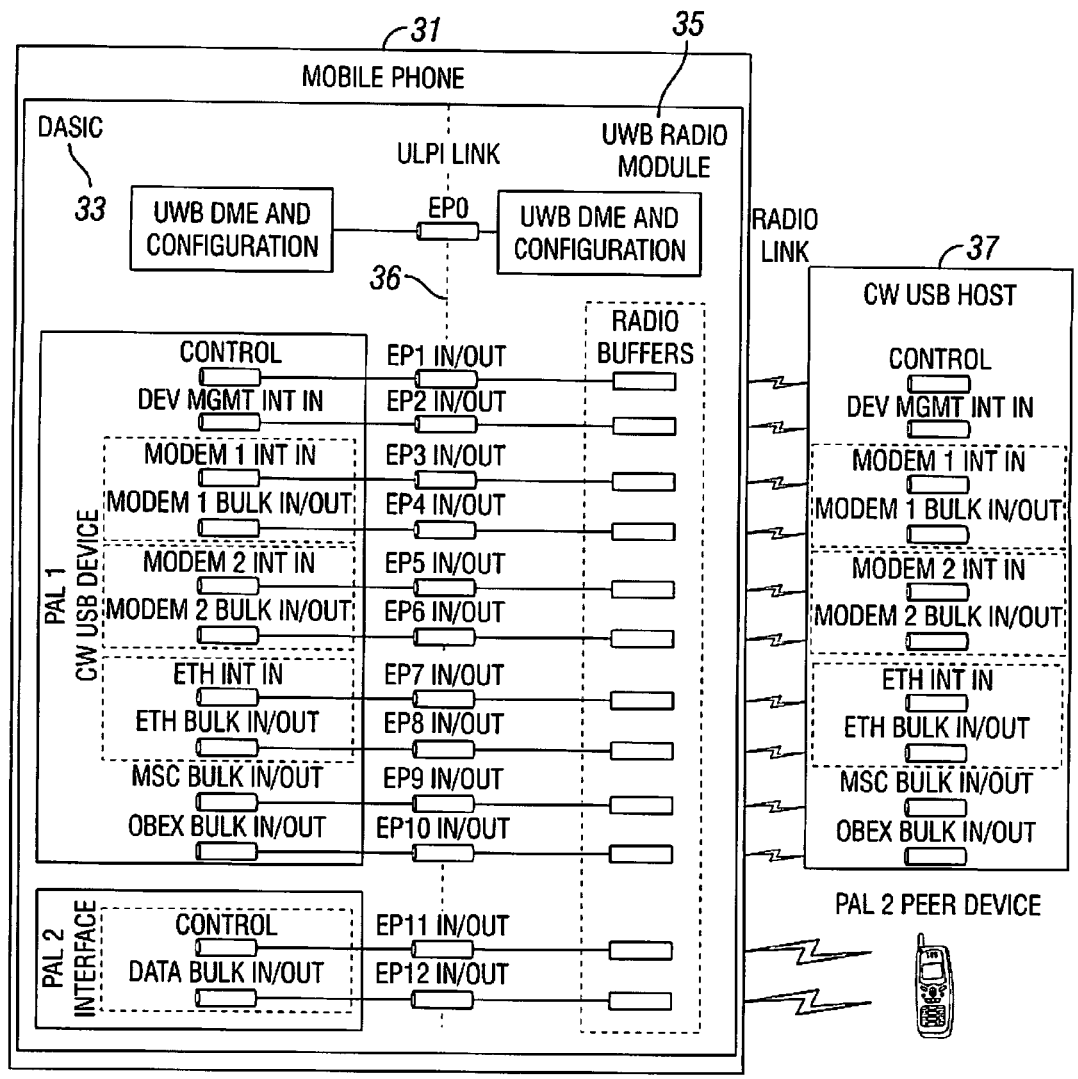
FIG. 13 is a simplified block diagram illustrating an embodiment of endpoint mapping over the ULPI link between the Mobile Phone DASIC and the UWB Radio Module utilizing direct mapping between endpoints.

FIG. 13 is a simplified block diagram illustrating an embodiment of endpoint mapping over the ULPI link 36 between the Mobile Phone DASIC 33 and the UWB Radio Module 35 utilizing direct mapping between endpoints. Local ULPI endpoints are associated with logical connections on the protocol stack level. In other words, endpoints are assigned to specific PALs. The WiMedia MAC layer handles the buffering of data received over the radio link per WUSB endpoint. These buffers are transferred to the corresponding WUSB device function in the DASIC from the UWB Radio Module. Thus, in this embodiment, a direct mapping is performed between wireless USB endpoints and wired endpoints for the internal transport link.

Preferably, the ULPI interface 36 should have the maximum endpoints available in hardware (30+control pipe). Initially, only the UWB RCI/DME interface is allocated (using the control EP). Upon activating the Wireless USB Device/Host stacks, only the wireless EP0 is associated. All other wireless EPs are associated with ULPI EPs during the wireless USB enumeration process.

Figure 14:
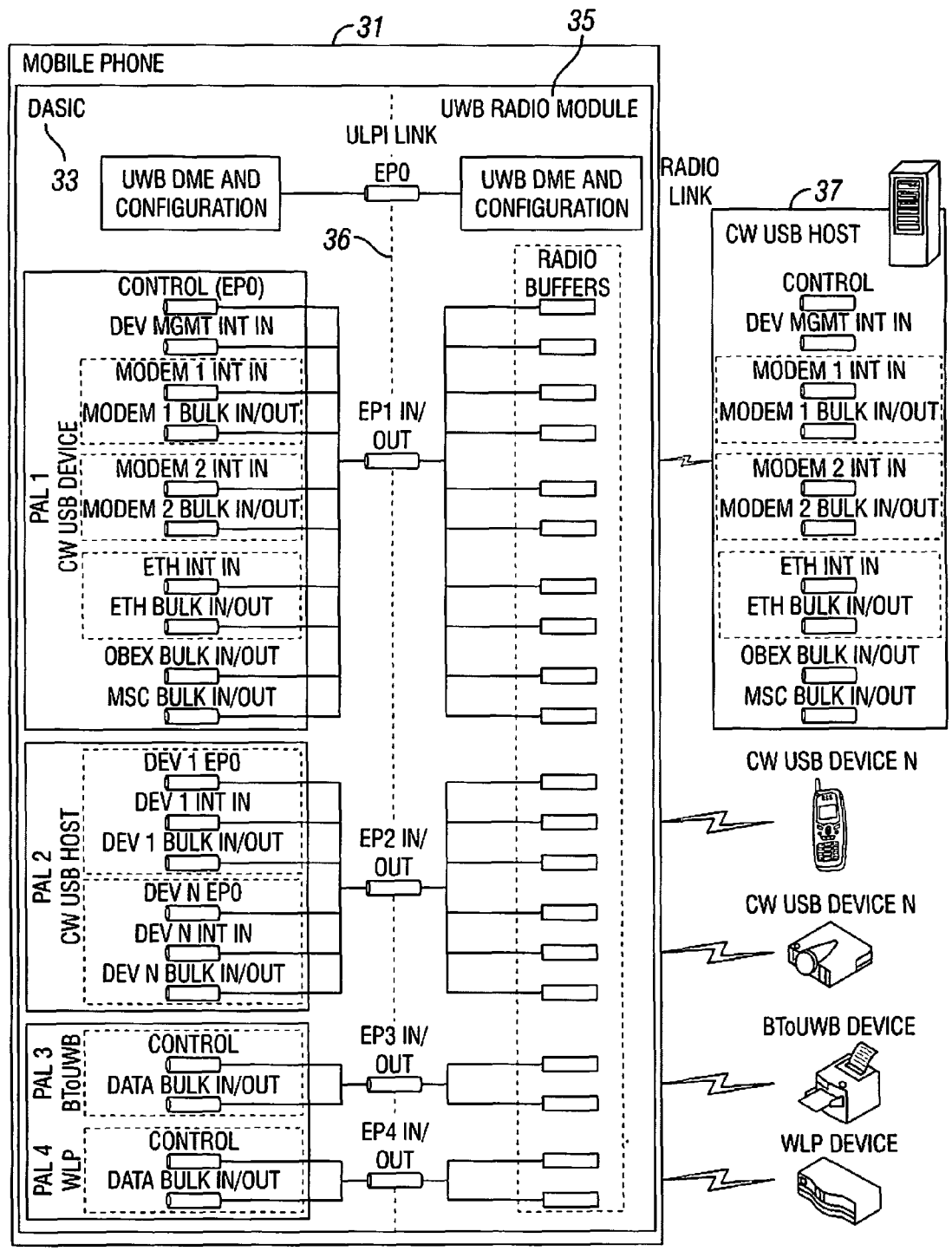
FIG. 14 is a simplified block diagram illustrating an embodiment of endpoint mapping over the ULPI link between the Mobile Phone DASIC and the UWB Radio Module utilizing multiplexed mapping between endpoints.

FIG. 14 is a simplified block diagram illustrating an embodiment of endpoint mapping over the ULPI link 36 between the Mobile Phone DASIC 33 and the UWB Radio Module 35 utilizing multiplexed mapping between endpoints. On power up, the UWB Radio Module enumerates itself on the ULPI link as a WMC Device with several interfaces allocated for each PAL. Device configuration is based on hardware characteristics of the UWB Radio Module and the Mobile Phone DASIC such as:

Number of endpoints supported;
Number of DMA channels available;
Double buffering for endpoints; and
Amount of buffer memory (RAM) available on both sides.

Vendor-specific requests on the control pipe are utilized to map ULPI endpoints to wireless USB endpoints or any logical connections needed for BToUWB and WLP (IP). ULPI endpoints for local links are mapped to a logical connection for a PAL or kept unassigned. In most mobile devices, it is likely that only one function will require a high-bandwidth data path while the rest of the functions are more likely low-bandwidth interfaces. This is due to limited capabilities of mobile devices compared to desktop PCs (screen size, input methods, and the like).

Figure 15:
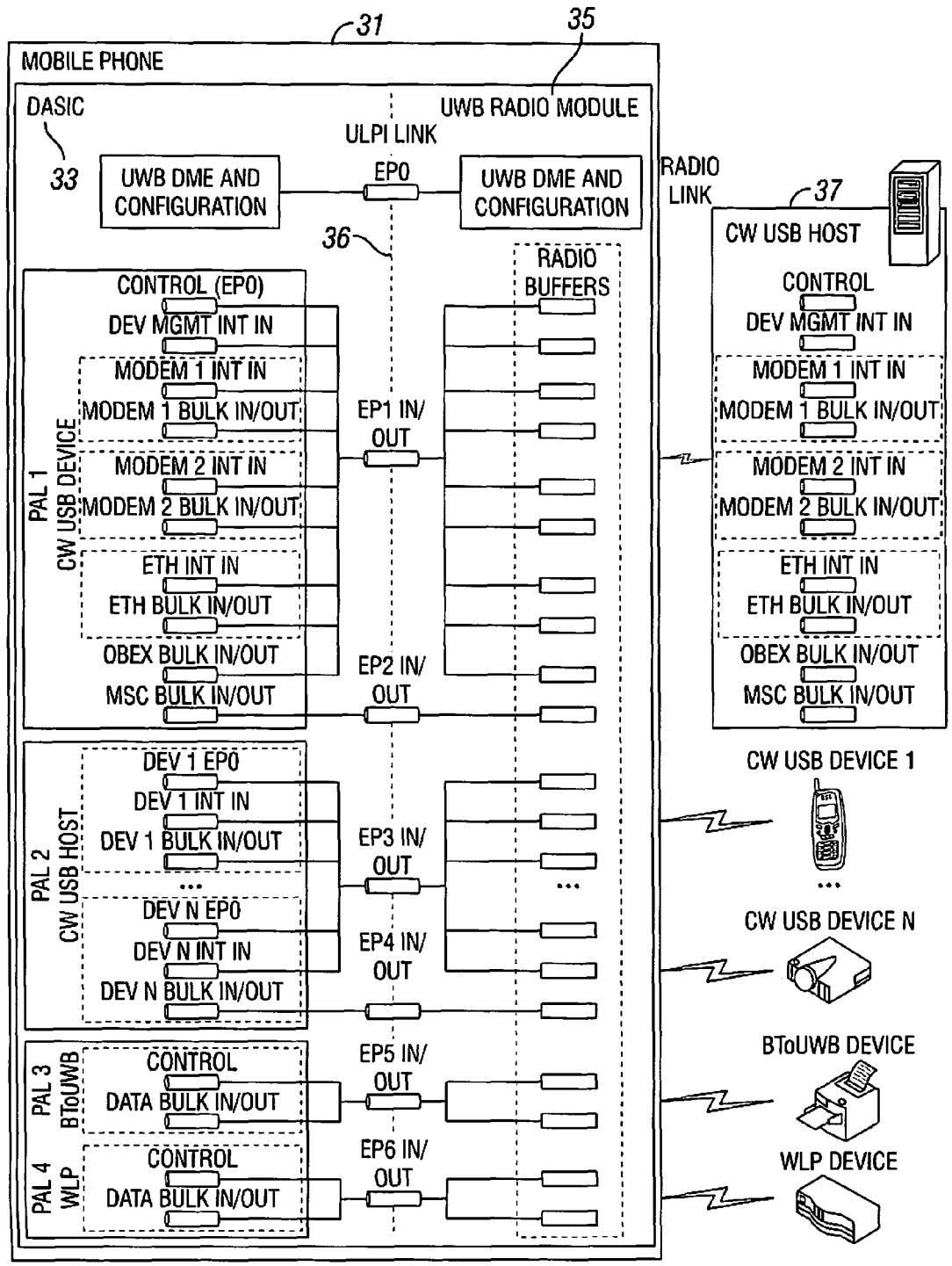
FIG. 15 is a simplified block diagram illustrating another embodiment of endpoint mapping in which multiplexing and direct mapping of endpoints are combined.

FIG. 15 is a simplified block diagram illustrating another embodiment of endpoint mapping over the ULPI link 36 between the Mobile Phone DASIC 33 and the UWB Radio Module 35. In this embodiment, multiplexing and direct mapping of endpoints are combined. Preferably, direct mapping is utilized for the high-throughput Wireless USB endpoint. The rest of the endpoints may be multiplexed. For the Wireless USB Host PAL, the endpoint of the device with more demanding throughput is chosen for direct mapping.

Figure 16:
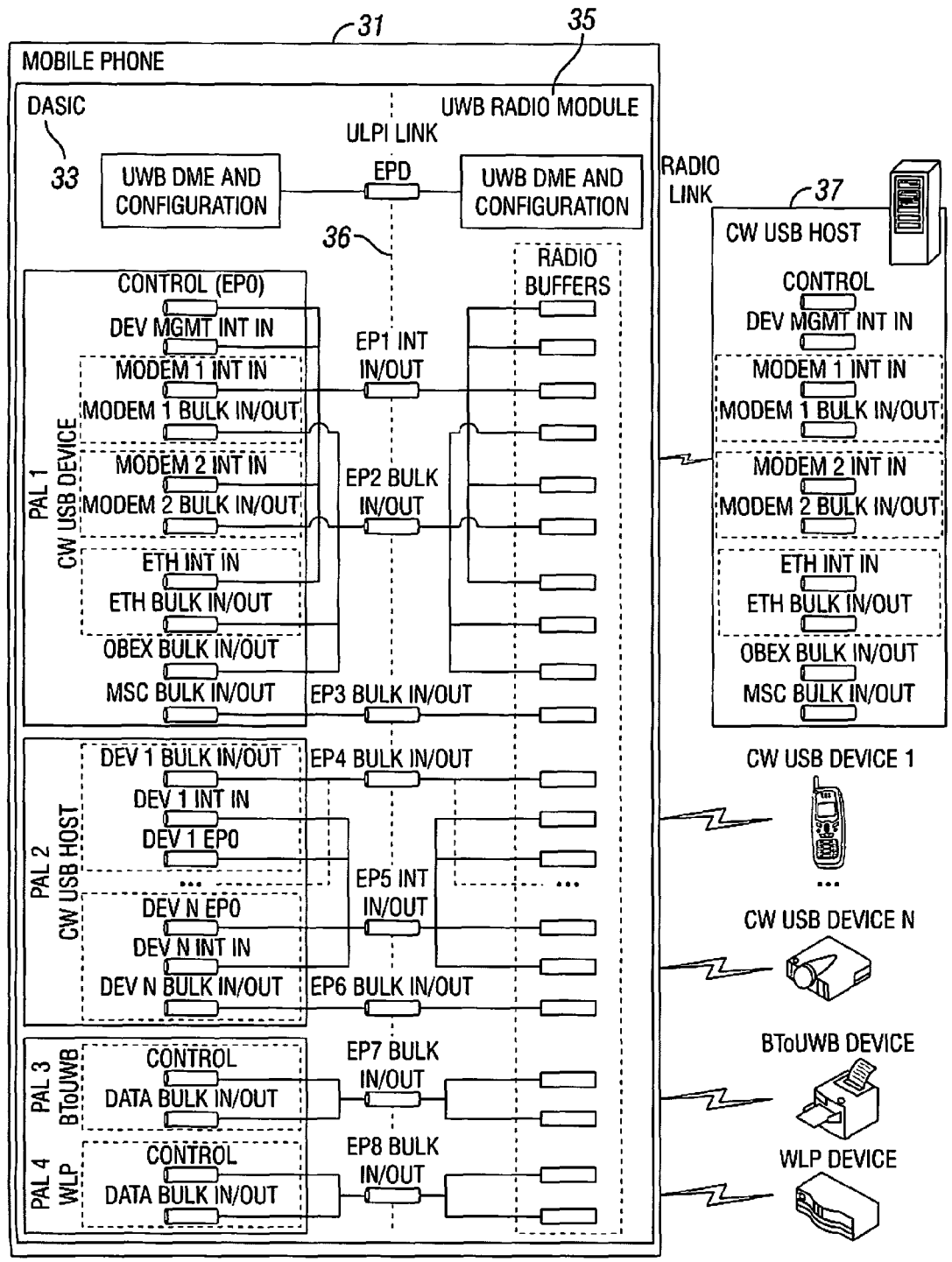
FIG. 16 is a simplified block diagram illustrating another embodiment of endpoint mapping in which multiplexing, sharing, and direct mapping of endpoints are combined.

FIG. 16 is a simplified block diagram illustrating another embodiment of endpoint mapping over the ULPI link 36 between the Mobile Phone DASIC 33 and the UWB Radio Module 35. In this embodiment, multiplexing, sharing, and direct mapping of endpoints are combined. The decision to choose an endpoint may be based on QoS requirements for a particular data stream. On the USB physical level, different scheduling mechanisms are used for bulk and interrupt endpoints. Overall system performance may be improved by sharing all interrupt endpoints over the ULPI endpoint of interrupt transfer type, while other bulk endpoints are either multiplexed or mapped directly by using bulk ULPI endpoints.

In the embodiment of FIG. 16, the following ULPI endpoints (IN/OUT) are used:

Interrupt EP1 is used for sharing interrupts for the Wireless USB Device, including wireless EP0.

Bulk EP2 is used for multiplexing low throughput bulk endpoints of the Wireless USB Device.

Bulk EP3 is used for direct mapping of Mass Storage endpoints (high throughput interface).

Bulk EP4 is used for multiplexing low throughput bulk endpoints of the Wireless USB Host (or low throughput bulk endpoints of connected Wireless USB Devices to this WUSB PAL).

Interrupt EP5 is used for sharing interrupts for the Wireless USB Host, including wireless EP0.

Bulk EP6 is used for direct mapping of high throughput endpoints (IN/OUT) of Wireless USB Device N.

Bulk EP7 and EP8 are used for multiplexing data for other PALs.

The number of data streams with direct mapping or sharing is limited only by the availability of spare endpoints on the ULPI link 36.

Figure 17:
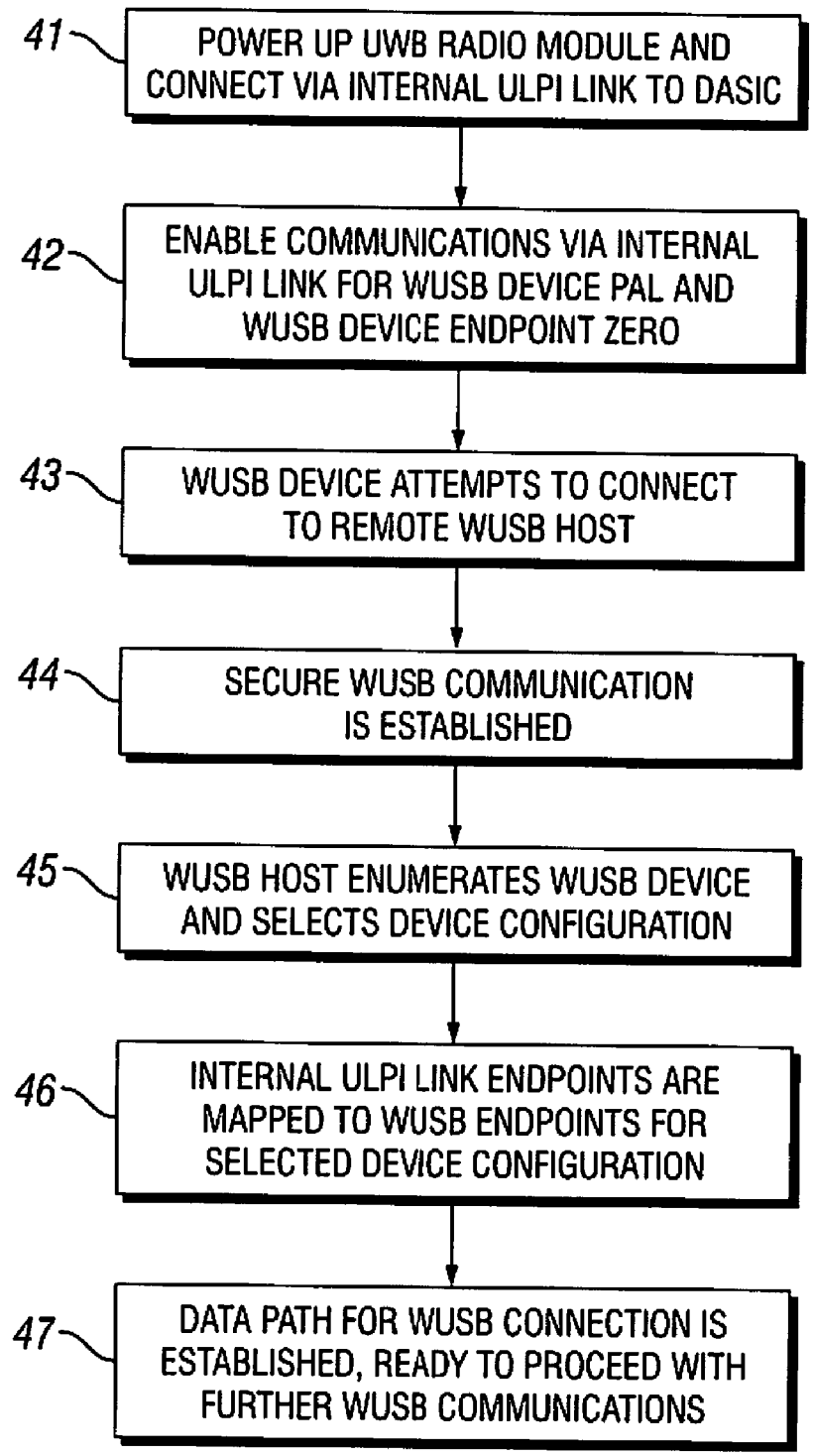
FIG. 17 is a flow chart illustrating the steps of an embodiment of the method of the present invention.

FIG. 17 is a flow chart illustrating the steps of an embodiment of the method of the present invention. At step 41, the UWB Radio Module is powered up and connected via an internal ULPI link to the DASIC. At step 42, communications are enabled via the internal ULPI link for the WUSB Device PAL and the WUSB Device Endpoint zero. At step 43, the WUSB Device attempts to connect to the remote WUSB Host (e.g., sends DN_Connect message). At step 44, secure WUSB communication is established. At step 45, the WUSB Host enumerates the WUSB device and selects a device configuration. At step 46, internal ULPI link Endpoints are mapped to WUSB endpoints for the selected configuration. At step 47, the data path for the WUSB connection is established, ready to proceed with further WUSB communications between peers.

Utilizing any of the embodiments described above enables the use of large data buffers for bulk endpoints (for example 64 KB), thus significantly reducing the interrupt load and increasing overall system throughput.

Other benefits of the invention include dynamic mapping of different protocol stacks (logical data streams) to USB endpoints for the local link, simple configuration routines, and the ability to make changes in configuration (adding or removing logical flows) without performing a USB reset or interrupting data streams over other interfaces. The invention may be utilized for any external chip using USB, ULPI or HSIC interface as a local transport link (data tunnel). It is also applicable for any future enhancement or addition to the HSIC interface. The usual USB interface can be used, so external UWB Radio Modules can be provided for existing devices with only a firmware update. Any combined radio technologies can utilize it (for example BT, FM, WiFi, NFC, and the like), and non-radio external functions such as audio, security, SIM, or others may be combined with radio. Utilizing a single interface for several functions provides a more cost-effective solution, and reuse of some existing USB device classes speeds up the implementation process.

Multiplexing of the logical connections provides additional benefits. For example, hardware with a limited number of endpoints can be utilized while still providing full UWB functionality. Different PALs are not affected by long duration transfers of another, and isochronous transfer is supported. There is also additional flexibility for configuration because the PALs are separated by using different endpoints or by using a PAL ID while combined. The invention reduces the interrupt rate for the Mobile Phone DASIC 33, thus reducing the amount of MIPS needed to handle UWB functionality.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. An apparatus in a mobile device for providing a plurality of functions for the mobile device, said apparatus comprising:
    a digital application-specific integrated circuit (DASIC) for controlling the mobile device according to applicable radio standards;
    a first multifunctional integrated circuit having means for providing a first plurality of functions; and
    a first Universal Serial Bus (USB) link connecting the DASIC and the first multifunctional integrated circuit, said first USB link including means for logically mapping endpoints associated with the first plurality of functions in the first multifunctional integrated circuit to local connection endpoints in the DASIC.

2. The apparatus as recited in claim 1, further comprising:
    a second multifunctional integrated circuit having means for providing a second plurality of functions; and
    a second USB link connecting the DASIC and the second multifunctional integrated circuit, said second USB link including means for logically mapping endpoints associated with the second plurality of functions in the second multifunctional integrated circuit to local connection endpoints in the DASIC.

3. The apparatus as recited in claim 2, wherein the DASIC includes:
    a first USB IP Block hardware module for terminating the first USB link in the DASIC; and
    a second USB IP Block hardware module for terminating the second USB link in the DASIC.

4. The apparatus as recited in claim 2, wherein the DASIC includes:
 a USB IP Block hardware module; and
 a USB hub connected to the USB IP Block hardware module for terminating the first and second USB links in the DASIC and providing connected functions to the USB IP Block hardware module.

5. The apparatus as recited in claim 1, wherein the USB link connecting the DASIC and the first multifunctional integrated circuit utilizes a Universal Transceiver Macrocell and Low Pincount Interface (ULPI), and the means for logically mapping endpoints includes means for mapping endpoints for each of the plurality of functions on the multifunctional integrated circuit to ULPI endpoints to establish an internal local link between the DASIC and the multifunctional chip.

6. The apparatus as recited in claim 2, wherein the internal USB link utilizes the ULPI interface and the external device is a wireless USB device, and the means for logically mapping endpoints includes means for multiplex mapping wireless USB device endpoints to ULPI endpoint to establish a single internal local link between the DASIC and the external UWB Radio Module.

7. The apparatus as recited in claim 6, wherein the means for multiplex mapping includes a USB device class for multiplexing and de-multiplexing a plurality of logical data streams.

8. The apparatus as recited in claim 7, wherein the means for multiplex mapping includes:
 USB hardware for providing a first level of multiplexing and de-multiplexing of the plurality of logical data streams; and
 a USB device class driver for providing additional levels of multiplexing and de-multiplexing of the plurality of logical data streams.

9. An apparatus in a mobile device having a digital application-specific integrated circuit (DASIC) and an ultra wideband (UWB) radio module, said apparatus comprising:
 an internal Universal Serial Bus (USB) link connecting the DASIC and the UWB radio module utilizing a Universal Transceiver Macrocell and Low Pincount Interface (ULPI) interface;
 wherein the internal USB link includes means for logically mapping endpoints in an external device to local connection endpoints in the DASIC;
 wherein the external device is a wireless USB device, and the means for logically mapping endpoints includes:
 means for multiplex mapping wireless USB device endpoints to ULPI endpoints to establish a single internal local link between the DASIC and the external UWB Radio Module, said internal local link providing an equal level of throughput for every logical link in the internal local link; and
 means for directly mapping wireless USB device endpoints to ULPI endpoints to establish a plurality of dedicated internal local links between the DASIC and the wireless USB device, said dedicated links providing a higher level of throughput than the multiplexed links.

10. The apparatus as recited in claim 9, wherein the means for logically mapping endpoints also includes:
 means for selecting either multiplex mapping, direct mapping, or a combination of multiplex mapping and direct mapping based on quality of service requirements for a particular data flow.

11. The apparatus as recited in claim 9, wherein the means for logically mapping endpoints also includes:
 means for sharing all interrupt endpoints over a ULPI endpoint of interrupt transfer type.

12. A method in a mobile device for providing a plurality of functions for the mobile device, said mobile device having a digital application-specific integrated circuit (DASIC) for controlling the mobile device according to applicable radio standards, said method comprising the steps of:
 providing a first plurality of functional modules on a first multifunctional integrated circuit;
 connecting the DASIC and the first multifunctional integrated circuit with a first Universal Serial Bus (USB) link; and
 logically mapping endpoints associated with the first plurality of functional modules on the first multifunctional integrated circuit to local connection endpoints in the DASIC utilizing the first USB link.

13. The method as recited in claim 12, further comprising:
 providing a second plurality of functional modules on a second multifunctional integrated circuit;
 connecting the DASIC and the second multifunctional integrated circuit with a second USB link; and
 logically mapping endpoints associated with the second plurality of functional modules on the second multifunctional integrated circuit to local connection endpoints in the DASIC utilizing the second USB link.

14. The method as recited in claim 13, wherein:
 the step of connecting the DASIC and the first multifunctional integrated circuit with a first USB link includes terminating the first USB link in the DASIC with a first USB IP Block hardware module, and
 the step of connecting the DASIC and the second multifunctional integrated circuit with a second USB link includes terminating the second USB link in the DASIC with a second USB IP Block hardware module.

15. The method as recited in claim 13, wherein the steps of connecting the DASIC and the first and second multifunctional integrated circuits with the first and second USB links include:
 terminating the first and second USB links in the DASIC utilizing a USB hub;
 connecting the USB hub to a USB IP Block hardware module; and
 providing connected functions from the USB hub to the USB IP Block hardware module.

16. The method as recited in claim 12, wherein:
 the step of connecting the DASIC and the first multifunctional integrated circuit with a first USB link includes utilizing a Universal Transceiver Macrocell and Low Pincount Interface (ULPI) for the USB link; and
 the step of logically mapping endpoints includes mapping endpoints for each of the plurality of functions on the multifunctional integrated circuit to ULPI endpoints to establish an internal local link between the DASIC and the multifunctional chip.

17. A method in a mobile device for connecting the mobile device to an external wireless device, said mobile device having a digital application-specific integrated circuit (DASIC) and an ultra wideband (UWB) radio module, said method comprising the steps of:
 connecting the DASIC to the UWB radio module with an internal Universal Serial Bus (USB) link that utilizes a Universal Transceiver Macrocell Interface (UTMI+) and Low Pincount Interface (ULPI) interface;
 communicating with the external device utilizing the UWB radio module; and
 logically mapping endpoints in the external device to local connection endpoints in the DASIC utilizing the internal USB link;
 wherein the external device is a wireless USB device, and the step of logically mapping endpoints includes multiplex mapping N wireless USB device endpoints to a plurality of ULPI endpoint IN/OUT pairs to establish between the DASIC and the external UWB Radio Module, a plurality of internal bi-directional local links having the same or different qualities.

18. The method as recited in claim 17, wherein the step of logically mapping endpoints also includes:
   directly mapping non-multiplexed wireless USB device endpoints to ULPI endpoints to establish a plurality of dedicated internal local links between the DASIC and the external UWB Radio Module, said dedicated links providing a higher level of throughput than the multiplexed links.

19. The method as recited in claim 18, wherein the step of logically mapping endpoints also includes:
   selecting either multiplex mapping, a combination of multiplex mapping and direct mapping, or direct mapping based on quality of service requirements for a particular data flow.

20. The method as recited in claim 19, wherein the step of logically mapping endpoints also includes:
   sharing all interrupt endpoints over a ULPI endpoint of interrupt transfer type.

* * * * *

UNITED STATES PATENT AND TRADEMARK OFFICE
CERTIFICATE OF CORRECTION

| | | |
|---|---|---|
| PATENT NO. | : 7,873,774 B2 | Page 1 of 1 |
| APPLICATION NO. | : 12/199208 | |
| DATED | : January 18, 2011 | |
| INVENTOR(S) | : Orishko et al. | |

It is certified that error appears in the above-identified patent and that said Letters Patent is hereby corrected as shown below:

In Column 4, Line 59, in Heading, delete "DRAWING" and insert -- DRAWINGS --, therefor.

Signed and Sealed this
Twelfth Day of April, 2011

David J. Kappos
*Director of the United States Patent and Trademark Office*